US 8,751,454 B1

(12) United States Patent
Bushman et al.

(10) Patent No.: US 8,751,454 B1
(45) Date of Patent: Jun. 10, 2014

(54) VIRTUAL DEFRAGMENTATION IN A DEDUPLICATION VAULT

(71) Applicant: Storagecraft Technology Corporation, Draper, UT (US)

(72) Inventors: Nathan S. Bushman, Pleasant Grove, UT (US); Andrew Lynn Gardner, Oak City, UT (US)

(73) Assignee: Storagecraft Technology Corporation, Draper, UT (US)

(*) Notice: Subject to any disclaimer, the term of this patent is extended or adjusted under 35 U.S.C. 154(b) by 0 days.

(21) Appl. No.: 14/166,569

(22) Filed: Jan. 28, 2014

(51) Int. Cl.
*G06F 17/00* (2006.01)

(52) U.S. Cl.
CPC ................................ *G06F 17/00* (2013.01)
USPC ........... 707/640; 707/661; 707/674; 707/687; 707/706

(58) Field of Classification Search
CPC ................................ G06F 17/00; G06F 11/14
USPC ................................................ 707/600–899
See application file for complete search history.

(56) References Cited

U.S. PATENT DOCUMENTS

| | | |
|---|---|---|
| 4,853,843 A | 8/1989 | Ecklund |
| 5,623,608 A | 4/1997 | Ng |
| 5,765,173 A | 6/1998 | Cane et al. |
| 5,778,430 A | 7/1998 | Ish et al. |
| 5,991,858 A | 11/1999 | Weinlander |
| 6,148,412 A | 11/2000 | Cannon et al. |
| 6,760,840 B1 | 7/2004 | Shimbo et al. |
| 6,912,629 B1 | 6/2005 | West et al. |
| 7,330,997 B1 | 2/2008 | Odom |
| 7,337,286 B1 | 2/2008 | West et al. |
| 7,447,854 B1 | 11/2008 | Cannon |
| 7,529,785 B1 | 5/2009 | Spertus et al. |
| 7,653,668 B1 | 1/2010 | Shelat et al. |
| 7,783,600 B1 | 8/2010 | Spertus et al. |
| 7,873,601 B1 | 1/2011 | Kushwah |
| 7,925,623 B2 | 4/2011 | Therrien et al. |
| 7,962,452 B2 | 6/2011 | Anglin |
| 8,037,032 B2 | 10/2011 | Pershin et al. |
| 8,041,677 B2 | 10/2011 | Sumner et al. |
| 8,055,613 B1 | 11/2011 | Mu et al. |
| 8,086,569 B2 | 12/2011 | Jasrasaria |
| 8,099,572 B1 | 1/2012 | Arora et al. |
| 8,117,410 B2 | 2/2012 | Lu et al. |
| 8,131,924 B1 | 3/2012 | Frandzel et al. |
| 8,190,836 B1 | 5/2012 | Zheng et al. |
| 8,281,099 B2 | 10/2012 | Kishi |
| 8,285,681 B2 | 10/2012 | Prahlad et al. |
| 8,335,770 B2 | 12/2012 | Merchant et al. |
| 8,364,641 B2 | 1/2013 | Hirsch |

(Continued)

OTHER PUBLICATIONS

U.S. Appl. No. 13/782,986, filed Mar. 1, 2013 titled "Defragmentation During Multiphase Deduplication".

(Continued)

*Primary Examiner* — Isaac M Woo
(74) *Attorney, Agent, or Firm* — Maschoff Brennan

(57) ABSTRACT

Virtual defragmentation in a deduplication vault. In one example embodiment, a method of virtual defragmentation in a deduplication vault includes a virtual defragmentation phase. The virtual defragmentation phase includes accessing file system metadata (FSM) blocks included in a backup of allocated blocks of a source storage and reordering block references in the FSM blocks to match the order of the corresponding blocks as stored in a deduplication vault storage.

20 Claims, 5 Drawing Sheets

(56) References Cited

U.S. PATENT DOCUMENTS

| | | |
|---|---|---|
| 8,380,678 B2 | 2/2013 | Manson |
| 8,407,186 B1 | 3/2013 | Cremelie et al. |
| 8,682,870 B1 | 3/2014 | Gardner |
| 2002/0073276 A1 | 6/2002 | Howard et al. |
| 2003/0105810 A1 | 6/2003 | McCroy et al. |
| 2003/0204609 A1 | 10/2003 | Anderson et al. |
| 2004/0267836 A1 | 12/2004 | Armangau et al. |
| 2005/0216665 A1 | 9/2005 | Takakuwa |
| 2005/0240813 A1 | 10/2005 | Okada et al. |
| 2006/0064416 A1 | 3/2006 | Sim-Tang |
| 2006/0173935 A1 | 8/2006 | Merchant et al. |
| 2007/0100913 A1 | 5/2007 | Sumner et al. |
| 2007/0136200 A1 | 6/2007 | Frank et al. |
| 2008/0005141 A1 | 1/2008 | Zheng et al. |
| 2008/0184001 A1 | 7/2008 | Stager |
| 2008/0208933 A1 | 8/2008 | Lyon |
| 2008/0235306 A1 | 9/2008 | Kim et al. |
| 2008/0244204 A1 | 10/2008 | Cremelie et al. |
| 2008/0307347 A1 | 12/2008 | Cisler et al. |
| 2009/0164529 A1 | 6/2009 | McCain |
| 2009/0204649 A1 | 8/2009 | Wong et al. |
| 2009/0204765 A1 | 8/2009 | Gupta et al. |
| 2009/0254507 A1 | 10/2009 | Hosoya et al. |
| 2010/0076934 A1 | 3/2010 | Pershin et al. |
| 2010/0191748 A1 | 7/2010 | Martin et al. |
| 2010/0257142 A1 | 10/2010 | Murphy et al. |
| 2010/0260187 A1 | 10/2010 | Ongole et al. |
| 2011/0010498 A1 | 1/2011 | Lay et al. |
| 2011/0016083 A1 | 1/2011 | Patterson |
| 2011/0173605 A1 | 7/2011 | Bourne |
| 2011/0218969 A1 | 9/2011 | Anglin et al. |
| 2011/0238775 A1 | 9/2011 | Wu et al. |
| 2011/0276737 A1 | 11/2011 | Mei et al. |
| 2012/0079221 A1 | 3/2012 | Sivasubramanian et al. |
| 2012/0109894 A1 | 5/2012 | Kishi |
| 2012/0136832 A1 | 5/2012 | Sadhwani |
| 2012/0136834 A1 | 5/2012 | Zhao |
| 2012/0150949 A1 | 6/2012 | Vijayan Retnamma et al. |
| 2012/0151177 A1* | 6/2012 | Kalach et al. ............... 711/203 |
| 2012/0151586 A1 | 6/2012 | Hentunen |
| 2012/0158660 A1 | 6/2012 | Hirsch |
| 2012/0198219 A1 | 8/2012 | Preimesberger et al. |
| 2012/0246457 A1 | 9/2012 | Sosnosky et al. |
| 2013/0024424 A1 | 1/2013 | Prahlad et al. |
| 2013/0042083 A1 | 2/2013 | Mutalik et al. |
| 2013/0046944 A1 | 2/2013 | Domyo et al. |
| 2013/0138620 A1 | 5/2013 | Yakushev et al. |
| 2013/0179407 A1 | 7/2013 | Stoakes |

OTHER PUBLICATIONS

U.S. Appl. No. 13/782,986, filed Jun. 10, 2013, Office Action.
U.S. Appl. No. 13/782,986, filed Nov. 1, 2013, Notice of Allowance.
U.S. Appl. No. 13/782,822, filed Mar. 1, 2013 titled "Restoring a Backup From a Deduplication Vault Storage".
U.S. Appl. No. 13/782,807, filed Mar. 1, 2013 titled "Change Tracking for Multiphase Deduplication".
U.S. Appl. No. 13/782,549, filed Mar. 1, 2013 titled "Multiphase Deduplication".
U.S. Appl. No. 13/782,717, filed Mar. 1, 2013 titled "Deduplication Vault Storage Seeding".
U.S. Appl. No. 13/782,957, filed Mar. 1, 2013 titled "Local Seeding of a Restore Storage for Restoring a Backup From a Remote Deduplication Vault Storage".
"10800:Acronis Backup & Recovery 10: Deduplication Best Pratices"; May 11, 2012; Updated Jan. 13, 2012; Webpage: http://kb.acronis.com/content/10800.
U.S. Appl. No. 13/782,822, filed Jun. 5, 2013, Office Action.
U.S. Appl. No. 13/782,822, filed Oct. 10, 2013, Office Action.
U.S. Appl. No. 13/782,822, filed Feb. 25, 2014, Office Action.
U.S. Appl. No. 13/782,822, filed Mar. 21, 2014, Notice of Allowance.
U.S. Appl. No. 13/782,807, filed Jul. 3, 2013, Office Action.
U.S. Appl. No. 13/782,807, filed Nov. 7, 2013, Office Action.
U.S. Appl. No. 13/782,807, filed Jan. 17, 2014, Office Action.
U.S. Appl. No. 13/782,807, filed Mar. 13, 2014, Notice of Allowance.
U.S. Appl. No. 13/782,549, filed Jun. 24, 2013, Office Action.
U.S. Appl. No. 13/782,549, filed Oct. 7, 2013, Office Action.
U.S. Appl. No. 13/782,717, filed Jun. 13, 2013, Office Action.
U.S. Appl. No. 13/782,717, filed Oct. 7, 2013, Office Action.
U.S. Appl. No. 13/782,957, filed Jun. 20, 2013, Office Action.
U.S. Appl. No. 13/782,957, filed Nov. 15, 2013, Office Action.

* cited by examiner

VIRTUAL DEFRAGMENTATION IN A DEDUPLICATION VAULT

FIELD

The embodiments disclosed herein relate to virtually defragmenting a backup of a source storage stored in a deduplication vault storage.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file as unallocated blocks. The file system generally tracks allocated and unallocated blocks using specialized data structures, referred to as file system metadata (FSM). FSM is also stored in designated blocks in the storage (FSM blocks).

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the contents of the files stored in the source storage (data blocks) as well as the blocks that make up the file system metadata (FSM blocks). Also, because image backup backs up all allocated blocks rather than individual files, this approach does not generally need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up the contents of individual files may be scattered, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® XP Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of backup storage and increase the bandwidth overhead of transporting data to the backup storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to virtually defragmenting a backup of a source storage stored in a deduplication vault storage. The example methods disclosed herein may be employed to reorder block references in file system metadata (FSM) blocks included in a backup of a source storage to match the order of the corresponding blocks as stored in a deduplication vault storage. Reordering block references in the FSM blocks of a backup of the source storage to match the order of the corresponding blocks in the vault storage may decrease the fragmentation of the data between the original order of the blocks in the source storage and the backup order of the blocks as backed up in the vault storage. This reordering of block references in the FSM blocks of a backup may decrease the amount of time necessary to subsequently restore the backup to a restore storage due to a decrease in the amount of seeking that must be performed at the vault storage and at the restore storage during the restore operation.

In one example embodiment, a method of virtual defragmentation in a deduplication vault includes a virtual defragmentation phase. The virtual defragmentation phase includes accessing FSM blocks included in a backup of allocated blocks of a source storage and reordering block references in the FSM blocks to match the order of the corresponding blocks as stored in a deduplication vault storage.

In another example embodiment, a method of multiphase deduplication includes an analysis phase, a backup phase, and a virtual defragmentation phase. The analysis phase includes analyzing each allocated block, including FSM blocks and data blocks, stored in a source storage at a point in time to determine if the block is duplicated in a vault storage. The backup phase is performed after completion of the analysis phase and includes storing, in the vault storage, a backup including each unique nonduplicate allocated block from the source storage. The virtual defragmentation phase includes accessing the FSM blocks that are included in the backup and reordering block references in the FSM blocks to match the order of the corresponding blocks as stored in the deduplication vault storage.

In yet another example embodiment, a method of multiphase deduplication includes an analysis phase, a backup phase, a virtual defragmentation phase, and a restore phase. The analysis phase includes analyzing each allocated block, including FSM blocks and data blocks, stored in a source storage at a point in time to determine if the block is duplicated in a vault storage. The backup phase is performed after completion of the analysis phase and includes storing, in the vault storage, a backup including each unique nonduplicate allocated block from the source storage. The virtual defragmentation phase includes accessing the FSM blocks that are included in the backup and reordering block references corresponding to data blocks in the FSM blocks to match the order of the corresponding blocks as stored in the deduplication vault storage. The block references for each set of local duplicate data blocks that are included in the backup are reordered as a run in the reordered FSM blocks. The restore phase is performed after the completion of the virtual defragmentation phase and includes reading, from the vault storage, and storing, in a restore storage, each allocated block that was stored in the source storage at the point in time in the position indicated in the reordered FSM blocks. Each of the runs of local duplicate data blocks is stored in the restore storage as indicated in the reordered FSM blocks.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
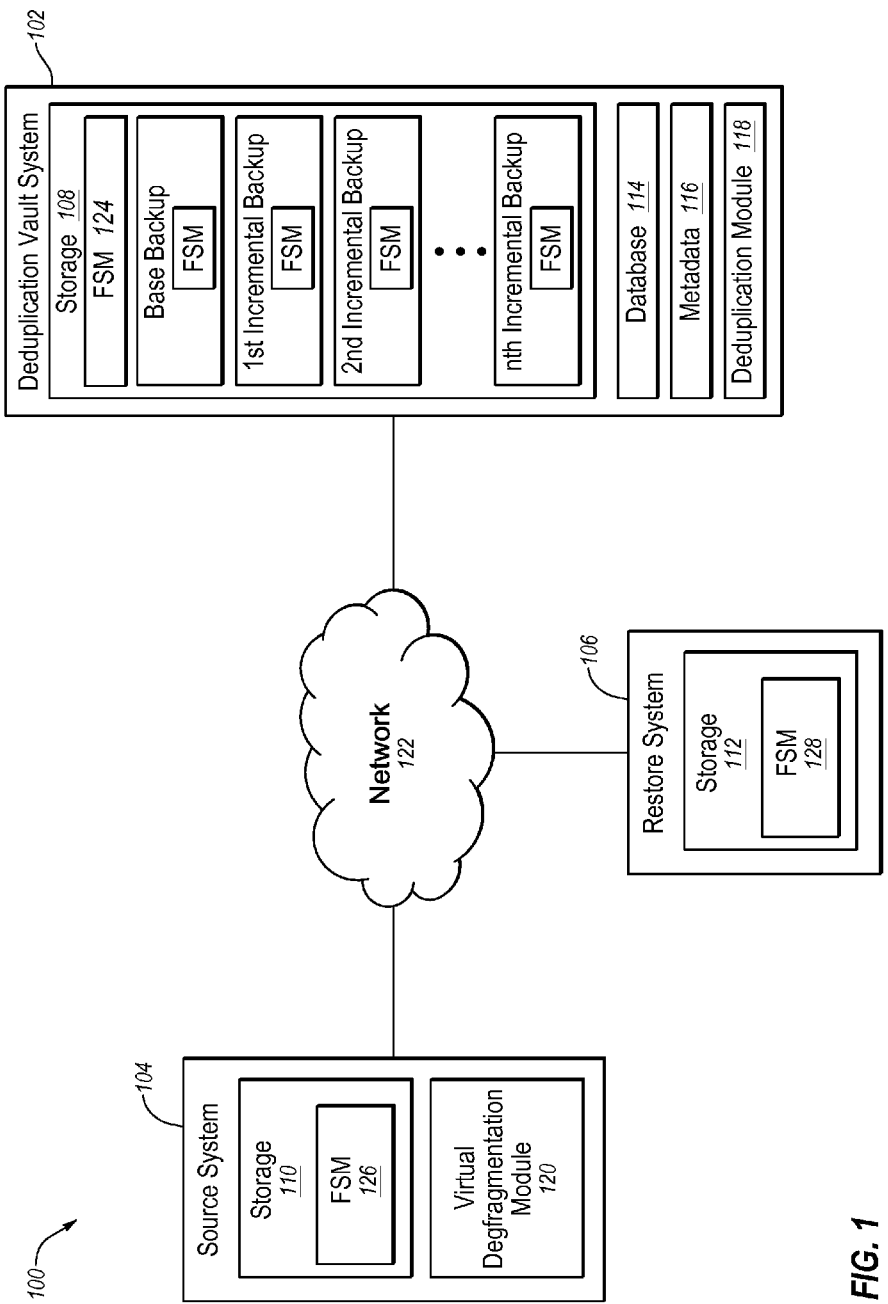
FIG. 1 is a schematic block diagram illustrating an example deduplication backup system.

In general, example embodiments described herein relate to virtually defragmenting a backup of a source storage stored in a deduplication vault storage. The example methods disclosed herein may be employed to reorder block references in file system metadata (FSM) blocks included in a backup of a source storage to match the order of the corresponding blocks as stored in a deduplication vault storage. Reordering block references in the FSM blocks of a backup of the source storage to match the order of the corresponding blocks in the vault storage may decrease the fragmentation of the data between the original order of the blocks in the source storage and the backup order of the blocks as backed up in the vault storage. This reordering of block references in the FSM blocks of a backup may decrease the amount of time necessary to subsequently restore the backup to a restore storage due to a decrease in the amount of seeking that must be performed at the vault storage and at the restore storage during the restore operation.

The term "storage" as used herein refers to computer-readable media, or some logical portion thereof such as a volume, capable of storing data in blocks. The term "block" as used herein refers to a fixed-length discrete sequence of bits. The term "run" as used herein refers to one or more blocks physically stored contiguously in a storage. The term "backup" when used herein as a noun refers to a copy or copies of one or more blocks from a storage. The phrase "virtually defragmenting a source storage to match a vault storage" or phrases equivalent thereto as used herein refer to reordering block references in FSM blocks included in a backup of a source storage to match the order of the corresponding blocks as stored in a deduplication vault storage. This "virtual defragmenting of a source storage" is distinct from file-centric defragmenting where blocks that make up the contents of a file that are initially stored in a storage in a non-contiguous fashion are reordered in the storage itself to place the blocks in a physically contiguous order in the storage. However, "virtual defragmenting of a source storage" may result in file-centric defragmentation, especially where blocks from matching files have been previously stored in the vault stored in a file-centric defragmented fashion. It is understood, of course, that a file-centric defragmentation of a source storage may additionally be performed prior to the "virtual defragmenting of a source storage" disclosed herein in order to place nonduplicate blocks in a file-centric defragmented order so that the nonduplicate blocks are stored in the vault storage in a contiguous order such that when identical blocks are reordered in other source storages (from identical files stored in the other source storages, for example) during the "virtual defragmenting" of the other source storages, the identical blocks will be reordered in a file-centric defragmented fashion. The term "FSM blocks" as used herein refers to blocks that include FSM, including blocks that include at least some portion of a file system file allocation table (FS-FAT) or at least some portion of a file system block allocation map (FSBAM). The term "data blocks" as used herein refers to blocks that make up the contents of a file.

FIG. 1 is a schematic block diagram illustrating an example deduplication backup system 100. As disclosed in FIG. 1, the example system 100 includes a deduplication vault system 102, a source system 104, and a restore system 106. The systems 102, 104, and 106 include storages 108, 110, and 112, respectively. The deduplication vault system 102 also includes a database 114, metadata 116, and a deduplication module 118. The source system 104 also includes a virtual defragmentation module 120. The systems 102, 104, and 106 are able to communicate with one another over a network 122.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, and flash memory drives. The network 122 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The storages 108, 110, and 112 include file system metadata (FSM) 124, 126, and 128, respectively, which may be stored in designated blocks in the storages (FSM blocks). Similarly, each of a base backup and multiple incremental backups of the source storage 110 that is stored in the vault storage 108 includes a copy of the FSM from the source storage 110. The backups stored in the vault storage 108 may be created by the deduplication module 118 of the deduplication vault system 102 of FIG. 1. For example, the deduplication module 118 may be configured to execute computer instructions to perform operations of creating a base backup and multiple incremental backups of the source storage 110.

For example, the deduplication module 118 may create a base backup of all allocated blocks of the source storage 110 as allocated at time t(0) and store the allocated blocks in the vault storage 108. The state of the source storage 110 at time t(0) may be captured using snapshot technology in order to capture the data stored in the source storage 110 at time t(0) without interrupting other processes, thus avoiding downtime of the source storage 110. The base backup may be very large depending on the size of the source storage 110 and the number of allocated blocks at time t(0). As a result, the base backup may take a relatively long time to create and consume a relatively large amount of space in the vault storage 108.

Then, the deduplication module 118 may create a 1st incremental backup of only changed allocated blocks of the source storage 110 present at time t(1) and store the changed allocated blocks in the vault storage 108, then later create a 2nd incremental backup of only changed allocated blocks of the source storage 110 present at time t(2) and store the changed allocated blocks in the vault storage 108. The states of the source storage 110 at times t(1) and t(2) may again be captured using snapshot technology, thus avoiding downtime of the source storage 110. Each incremental backup includes only those allocated blocks from the source storage 110 that were changed after the time of the previous backup. Thus, the 1st incremental backup includes only those allocated blocks from the source storage 110 that changed between time t(0) and time t(1), and the 2nd incremental backup includes only those allocated blocks from the source storage 110 that changed between time t(1) and time t(2). In general, as compared to the base backup, each incremental backup may take a relatively short time to create and consume a relatively small storage space in the vault storage 108.

Finally, the deduplication module 118 may create an nth incremental backup of only changed allocated blocks of the source storage 110 present at time t(n), using snapshot technology, and store the changed allocated blocks in the vault storage 108. The nth incremental backup includes only those allocated blocks from the source storage 110 that changed between time t(n) and time t(n−1).

Therefore, incremental backups may be created on an ongoing basis. The frequency of creating new incremental backups may be altered as desired in order to adjust the amount of data that will be lost should the source storage 110 experience corruption of its stored data or become unavailable at any given point in time. The data from the source storage 110 can be restored to the state at the point in time of a particular incremental backup by applying the backups from oldest to newest, namely, first applying the base backup and then applying each successive incremental backup up to the particular incremental backup.

Although only allocated blocks are included in the example incremental backups discussed above, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only a base backup and incremental backups are discussed above, it is understood that the source storage 110 may instead be backed up by creating a base backup and decremental backups. Decremental backups are created by initialing creating a base backup to capture the state at an initial point in time, then updating the base backup to capture the state at a subsequent point in time by modifying only those blocks in the base backup that changed between the initial and subsequent points in time. Prior to the updating of the base backup, however, the original blocks in the base backup that correspond to the changed blocks are copied to a decremental backup, thus enabling restoration of the source storage 110 at the initial point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the creation of backups as disclosed herein is not limited to a base backup and incremental backups but may also include a base backup and decremental backups.

During performance of the example methods disclosed herein, the deduplication module 118 may analyze, during one phase, the allocated blocks stored in the source storage 110, for example, at a point in time to determine if the allocated blocks are already duplicated in the vault storage 108. Then, the deduplication module 118 may back up, during a subsequent phase, those blocks from the source storage 110 that do not already have duplicate blocks stored in the vault storage 108. Also, the virtual defragmentation module 120 may reorder, during another phase, block references in the copy of the FSM included in the base backup or in one of the incremental backups of the source storage 110 to match the order of the corresponding blocks as stored in the vault storage 108.

The database 114 and the metadata 116 may be employed to track information related to the source storage 110, the vault storage 108, and the backup of the source storage 110 that are stored in the vault storage 108. For example, the database 114 and the metadata 116 may be identical in structure and function to the database 500 and the metadata 700 disclosed in related U.S. patent application Ser. No. 13/782, 549, titled "MULTIPHASE DEDUPLICATION," which was filed on Mar. 1, 2013 and is expressly incorporated herein by reference in its entirety. Subsequently, the deduplication module 118 may restore, during another subsequent phase, each block that was stored in the source storage 110 at the point in time to the restore storage 112 as previously reordered during the reordering by the virtual defragmentation module 120.

As discussed in greater detail below, reordering block references in the FSM of a backup of the source storage 110 to match the order of the corresponding blocks in the vault storage 108 may decrease the fragmentation of the data between the original order of the blocks in the source storage 110 and the backup order of the blocks as backed up in the vault storage 108. This reordering of block references in the FSM of a backup may decrease the amount of time necessary to subsequently restore the backup to the restore storage 112 due to a decrease in the amount of seeking that must be performed at the vault storage 108 and at the restore storage 112 during the restore operation.

In one example embodiment, the deduplication vault system 102 may be a file server, the source system 104 may be a first desktop computer, the restore system 106 may be a second desktop computer, and the network 122 may include the internet. In this example embodiment, the file server may be configured to periodically back up the storage of the first desktop computer over the internet. The file server may then be configured to restore the most recent backup to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, or 106 may instead include two or more storages. Further, although the systems 102, 104, and 106 are disclosed in FIG. 1 as communicating over the network 122, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the storage 110 may function as both a source storage during the creation of a backup and a restore storage during a restore of the backup, which may enable the storage 110 to be restored to a state of an earlier point in time. Further, although the deduplication module 118 and the virtual defragmentation module 120 are the only modules disclosed in the example deduplication backup system 100 of FIG. 1, it is understood that the functionality of the modules 118 and 120 may be replaced or augmented by one or more similar modules residing on any of the systems 102, 104, and 106. For example, the deduplication vault system 102 may include a module similar to the virtual defragmentation module 120 in order to perform a virtual defragmentation phase, such as the virtual defragmentation phase 404 disclosed herein in connection with FIG. 4, at the deduplication vault system 102 during or after the storing of a backup of the source storage 110 in the vault storage 108. Finally, although only a single source storage and a single restore storage are disclosed in the example deduplication backup system 100 of FIG. 1, it is understood that the deduplication vault system 102 of FIG. 1 may be configured to simultaneously back up or restore multiple source storages. For example, the greater the number of storages that are backed up to the vault storage 108 of the deduplication vault system 102, the greater the likelihood for reducing redundancy and overall size of the data being backed up, resulting in corresponding decreases in the bandwidth overhead of transporting data to the backup storage.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
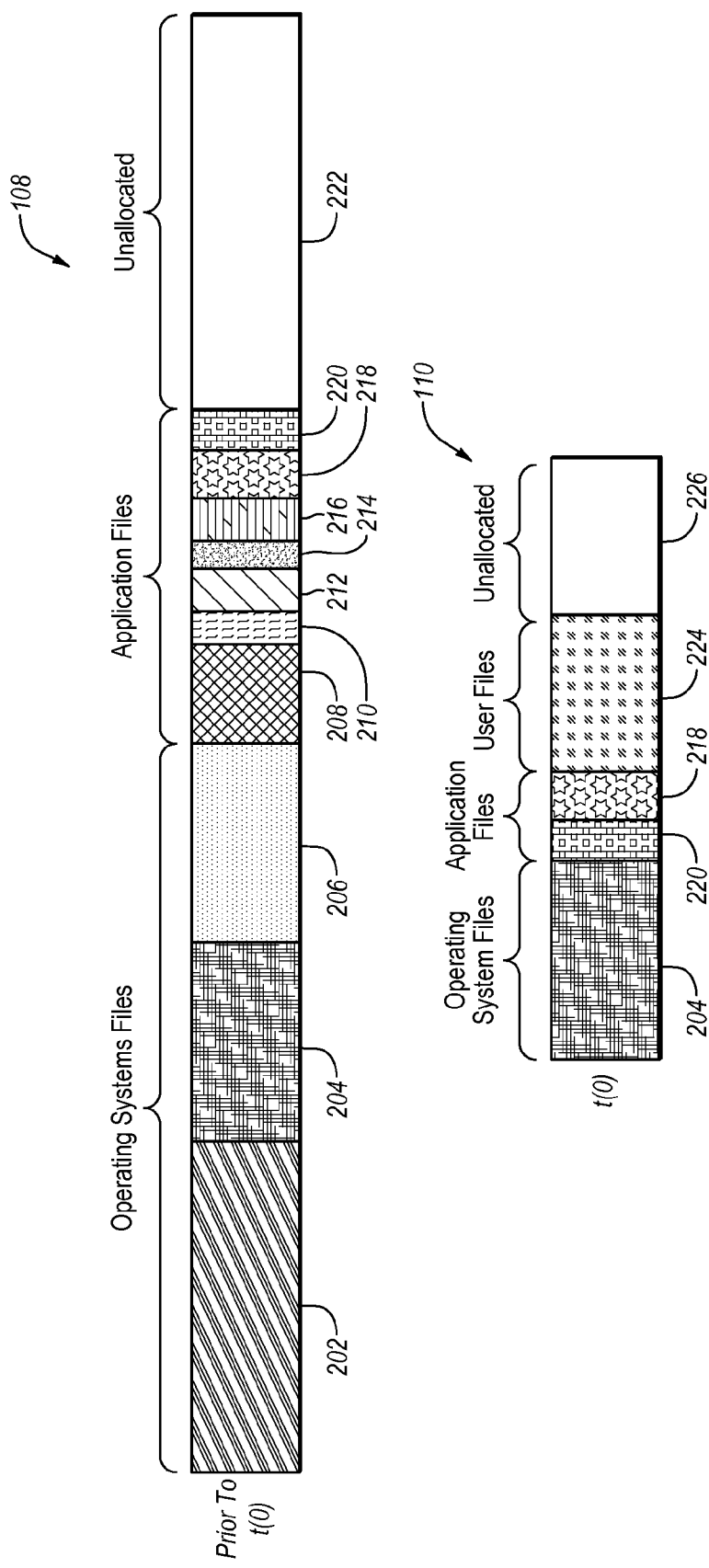
FIG. 2 is a schematic block diagram illustrating an example vault storage and an example source storage before performance of a virtual defragmentation phase.
Figure 4:
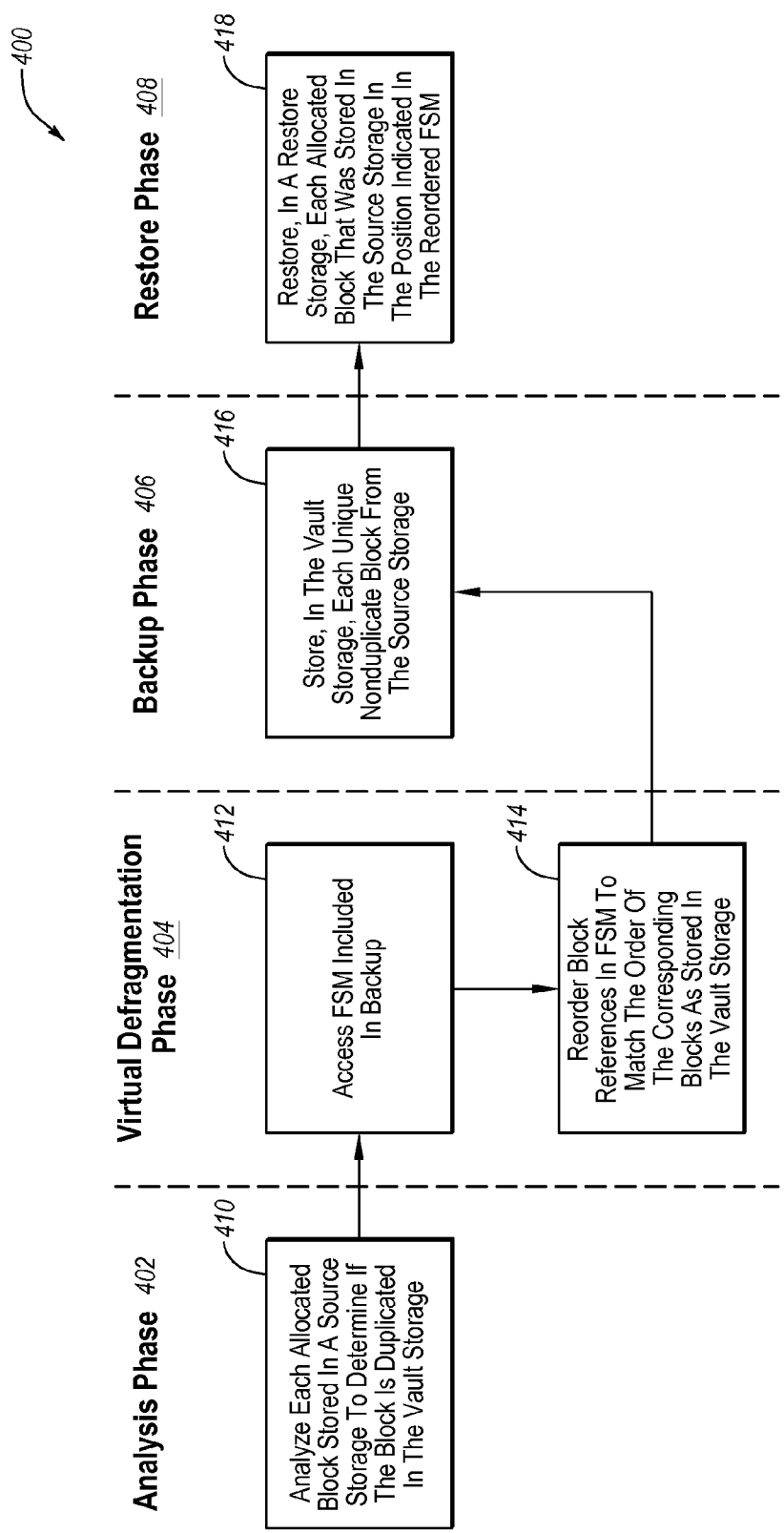
FIG. 4 is a schematic flowchart diagram of an example method of virtual defragmentation in a deduplication vault.

FIG. 2 is a schematic block diagram illustrating the example vault storage 108 and the example source storage 110 before performance of a virtual defragmentation phase, such as the virtual defragmentation phase 404 disclosed herein in connection with FIG. 4. The virtual defragmentation of the source storage 110 may be performed, in at least some embodiments, by the virtual defragmentation module 120 of the source system 104 of FIG. 1. For example, the virtual defragmentation module 120 may be configured to execute computer instructions to perform an operation of virtually defragmenting the source storage 110 prior to, during, or after the storing of a backup of the source storage 110 in the vault storage 108.

As disclosed in FIG. 2, the vault storage 108 and the source storage 110 are each partitioned into a physical layout of runs 202-226. Each of the runs 202-226 includes multiple blocks. In some example embodiments, the size of each block is 4096 bytes, although any other block size could instead be employed. The size of each block may be configured to match the standard sector size of a file system of the vault storage 108 and the source storage 110. In some example embodiments, the total number of blocks in the vault storage 108 may be greater than the total number of blocks in the source storage 110 in order to allow multiple storages to be backed up in the vault storage 108. In some example embodiments, the vault storage 108 and the source storage 110 may each have millions or even billions of blocks, or more. The blank runs 222 and 226 illustrated in FIG. 2 represent unallocated blocks. Each run illustrated with a unique pattern in FIG. 2 represents a unique run of allocated blocks.

As disclosed in FIG. 2, prior to the time t(0) of the backup of the source storage 110, the vault storage 108 may have already had blocks of data stored therein from other source storage backups. Alternatively or additionally, the vault storage 108 may have been seeded prior to time t(0) with common blocks of data. For example, the vault storage 108 may have been seeded with runs 202, 204, and 206, which each makes up the files of a common operating system. The runs 202, 204, and 206 may each be stored in the vault storage 108 in the sequence of a clean install of the operating system. In this example, where each block is 4096 bytes in length, the run 202 may include the 2,621,440 blocks that make up a clean install of the 10 gigabytes of files of the WINDOWS® 7 operating system, the run 204 may include the 1,572,864 blocks that make up a clean install of the 6 gigabytes of files of the Linux 3.6.6 operating system, and the run 206 may include the 2,359,296 blocks that make up a clean install of the 9 gigabytes of files of the WINDOWS® 8 operating system. It is understood that the gigabyte sizes listed in this example are estimates only.

In addition, the vault storage 108 may have been seeded with runs 208-220, which each makes up the files of a common software application. The runs 208-220 may each be stored in the vault storage 108 in the sequence of a clean install of the software application. Continuing with the example above, the run 208 may include the 786,432 blocks that make up a clean install of the 3 gigabytes of files of the MICROSOFT® Office 2010 software application, and each of the runs 210-220 may include the blocks that make up a clean install of the files of the Adobe Photoshop Elements 11 software application, the Norton Internet Security 2013 software application, the Quicken Deluxe 2013 software application, the QuickBooks Pro 2013 software application, the Adobe Reader software application, and the Firefox Browser software application, respectively.

Continuing with the above example, the source storage 110 includes a clean install of the Linux 3.6.6 operating system included in the run 204, a clean install of the Adobe Reader software application included in the run 218, and a clean install of the Firefox Browser software application included in the run 220. Each of the runs 204, 218, and 220 stored in the source storage 110 at time t(0) is identical to the runs 204, 218, and 220 that were stored in the vault storage 108 prior to the time t(0) during the seeding of the vault storage 108. Thus, at the time of the creation of a backup of the source storage 110 at time t(0), all of the blocks in the runs 204, 218, and 220 are already duplicated in the vault storage 108. In this example, the seeding of the vault storage 108 with the runs 204, 218, and 220 that make up the contents of the files of a common operating system and common software applications, prior to the backing up of the source storage 110 at time t(0), results in an increase in the number of blocks from the source storage 110 that are already duplicated in the vault storage 108. Therefore, during the creation of a base backup of the source storage 110 to capture the state at time t(0), all allocated blocks of the source storage 110 do not need to be transported from the source storage 110 to the vault storage 108. Instead, only the nonduplicate blocks in the run 224 need to be transported, and the duplicate blocks in the runs 204, 218, and 220 do not need to be transported. Thus, the seeding of the vault storage 108 results in decreased bandwidth overhead, due to transporting fewer blocks, and increased efficiency and speed during the creation of the backup. Further, seeding the vault storage 108 with each of the runs 204, 218, and 220 in the sequence of a clean install may further increase the efficiency and speed during the restoration of the backup. Additional details regarding the seeding of the vault storage 108 are disclosed in related U.S. patent application Ser. No. 13/782,717, titled "DEDUPLICATION VAULT STORAGE SEEDING," which was filed on Mar. 1, 2013 and is expressly incorporated herein by reference in its entirety.

As disclosed in FIG. 2, not all of the duplicate runs stored in the source storage 110 are stored in the same order as the duplicate runs stored in the vault storage 108. For example, the duplicate run 220 is stored before the duplicate run 218 in the source storage 110, while the duplicate run 220 is stored after the duplicate run 218 in the vault storage 108. This fragmentation between the vault storage 108 and the source storage 110 may result in an increase in the amount of seeking performed at the time of a restore of the source storage. To avoid this increase in the amount of seeking, the block references in an FSM of a backup of the source storage 110 corresponding to the runs 218 and 220 may be reordered in the FSM to match the order of the runs 218 and 220 as stored in the vault storage 108. For example, this reordering may occur during a virtual defragmentation phase, as discussed below, so that after the virtual defragmentation phase the block references in the FSM corresponding to the run 220 are stored after the block references in the FSM corresponding to the run 218 to match the order of these runs in the vault storage 108. Then, during a subsequent restore phase, the runs 218 and 220 can be copied to a restore storage, such as the restore storage 112 of FIG. 1, without having to switch the order of the runs 218 and 220, thus reducing seeking in the vault storage 108 and/or the restore storage 112.

Figure 3A:
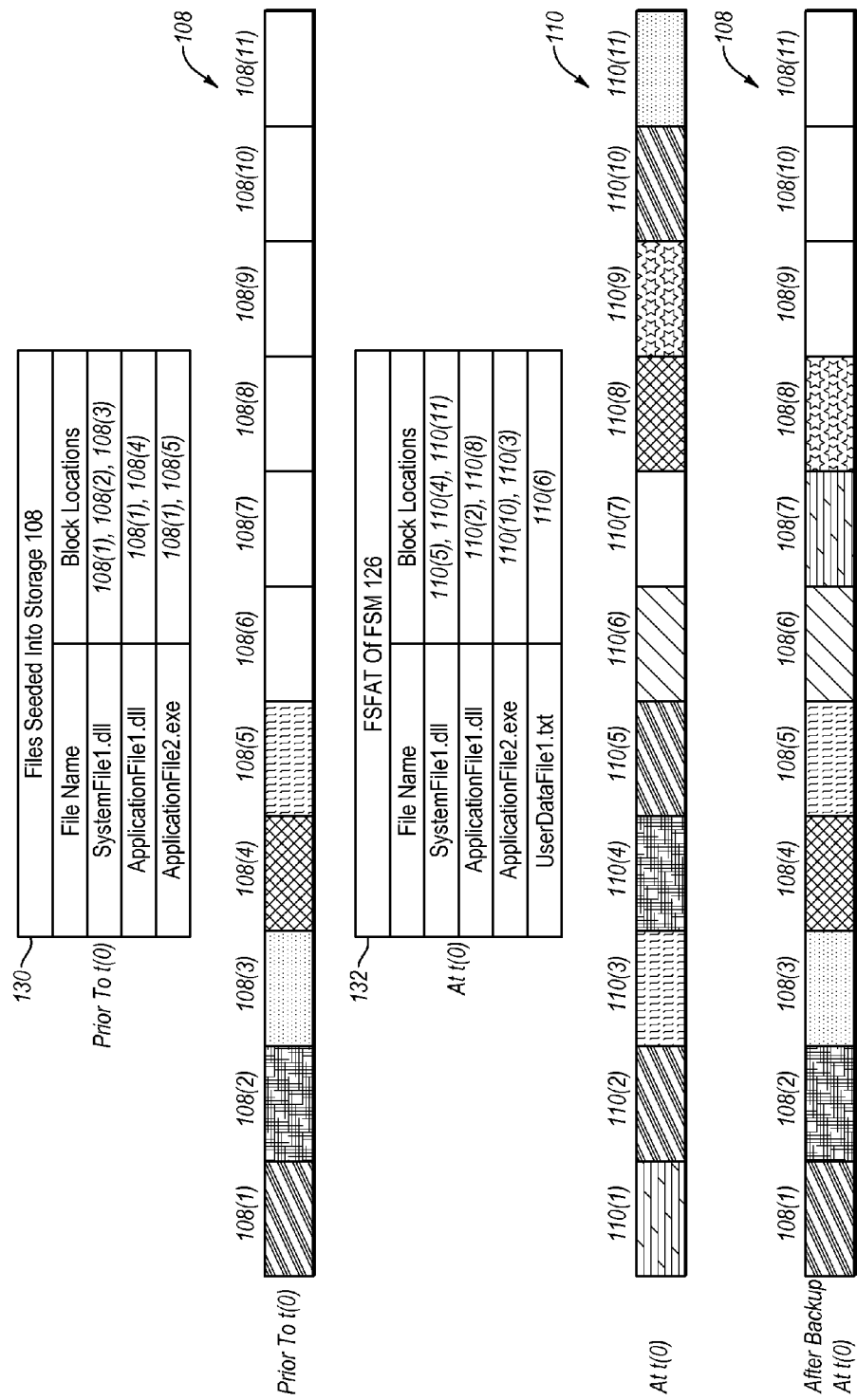
FIGS. 3A and 3B are schematic block diagrams illustrating an example vault storage, an example source storage, and an example restore storage, along with portions of corresponding file system metadata, both before and after performance of a virtual defragmentation phase.
Figure 3B:
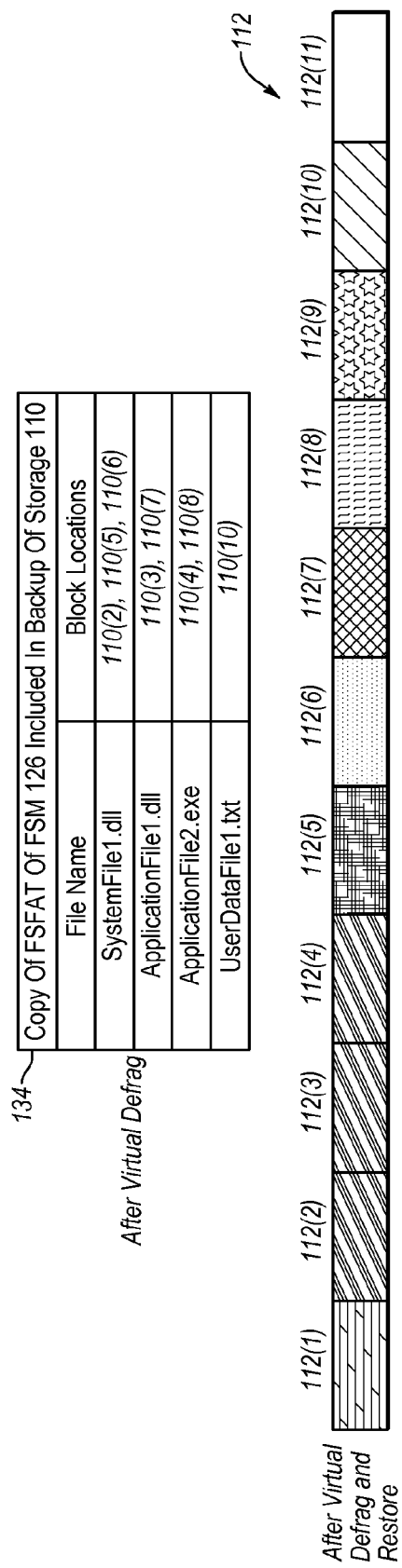

FIGS. 3A and 3B are schematic block diagrams illustrating the blocks stored in the vault storage 108, the source storage 110, and the restore storage 112, along with portions of corresponding FSM, both before and after performance of a virtual defragmentation phase, such as the virtual defragmentation phase 404 disclosed herein in connection with FIG. 5. The virtual defragmentation of the source storage 110 may be performed, in at least some embodiments, by the virtual defragmentation module 120 of the source system 104 of FIG. 1. For example, the virtual defragmentation module 120 may be configured to execute computer instructions to perform an operation of defragmenting the source storage 110 prior to, during, or after the storing of a backup of the source storage 110 in the vault storage 108. Each blank block illustrated in FIGS. 3A and 3B represents an unallocated block, while each block illustrated in FIGS. 3A and 3B with a unique pattern represents a unique allocated block.

FIG. 3A discloses files seeded into the vault storage 108 (table 130) as well as a file system file allocation table (FSFAT) of the FSM 126 of the source storage 110 (FSFAT 132). It is noted that in addition to the FSFAT 132 disclosed in FIG. 3A, the FSM 126 may each additionally include a file system block allocation map (FSBAM) which indicates which blocks in the corresponding storage are allocated and which blocks in the corresponding storage are unallocated. As disclosed in FIG. 3A, each of the table 130 and the FSFAT 132 tracks the file names and corresponding block locations of files stored in the corresponding storage. This tracking may be performed using block references listed in the Block Locations column of the table 130 and the FSFAT 132, where the order of each block reference indicates the order of the corresponding blocks as stored in the corresponding storage.

For example, prior to the time t(0) of the creation of the base backup of the source storage 110, the table 130 indicates that the seeded file named SystemFile1.dll is made up of the three blocks stored in locations 108(1), 108(2), and 108(3). Similarly, the table 130 indicates that the seeded file named ApplicationFile1.dll is made up of the two blocks stored in locations 108(1) and 108(4). Also, the table 130 indicates that the seeded file named ApplicationFile2.dll is made up of the two blocks stored in locations 108(1) and 108(5). It is noted that the block stored at the block location 108(1) is duplicated in the files SystemFile1.dll, ApplicationFile1.dll, and ApplicationFile2.dll. However, since the vault storage 108 is configured to store only a single copy of each unique block, the block stored at the block location 108(1) is therefore deduplicated by being stored only once in the vault storage 108. Therefore, the seven blocks that make up the contents of the seeded files SystemFile1.dll, ApplicationFile1.dll, and ApplicationFile2.dll are stored in only five blocks in the vault storage 108.

At the time t(0) of the creation of the base backup of the source storage 110, the FSFAT 132 indicates that the source storage 110 also includes three files named SystemFile1.dll, ApplicationFile1.dll, and ApplicationFile2.dll. In addition, however, the FSFAT 132 indicates that the source storage 110 also includes another file named UserDataFile1.txt. The FSFAT 132 indicates the locations of each of the blocks that make up the contents of these four files using the block references in the Block Locations column. It is noted that even though the three files named SystemFile1.dll, ApplicationFile1.dll, and ApplicationFile2.dll include a duplicate block, as discussed above in connection with the table 130, this duplicate block is stored multiple times in locations 110(5), 110(2), and 110(10), instead of being deduplicated by only being stored once, since the source storage 110 is not a deduplicated storage as is the vault storage 108. Therefore, the eight blocks that make up the contents of the files SystemFile1.dll, ApplicationFile1.dll, ApplicationFile2.dll, and UserDataFile1.txt are stored in eight blocks in the source storage 110. Further, the source storage 110 includes two FSM blocks at locations 110(1) and 110(9), which may be employed to store, for example, the FSFAT 132 and/or an FSBAM of the FSM 126.

It is further noted that even though both the vault storage 108 and the source storage include identical files named SystemFile1.dll, ApplicationFile1.dll, and ApplicationFile2.dll having identical blocks, the order of the blocks differs between the vault storage 108 and the source storage 110. The fragmentation between the vault storage 108 and the source storage 110 as disclosed in FIG. 3A may result in an increase in the amount of seeking performed at the time of a restore of the source storage 110. To avoid this increase in the amount of seeking, the block references in a copy of the FSFAT 132 that is included in a backup of the source storage 110 may be reordered to match the order of the corresponding blocks in the vault storage 108, as disclosed in FIG. 3B and as discussed below.

During the creation of the base backup of the source storage 110 at the time t(0), FIG. 3A discloses that the vault storage 108 will have the data block from position 110(6) stored at 108(6), the FSM block from position 110(1) stored at the position 108(7), and the FSM block from position 110(9) stored at the block position 108(8). Since one copy of all of the other allocated blocks from the source storage 110 at the time t(0) was already stored in the positions 108(1)-108(5) prior to the time t(0), there is no need to move these blocks again to the vault storage 108. Therefore, after the creation of the base backup of the source storage 110 at the time t(0), FIG. 3A discloses that eight unique blocks are stored in the vault storage 108 in locations 108(1)-108(8).

As noted above, and as disclosed in FIG. 3B, the defragmentation between the source storage 110 and the vault storage 108, and the resulting increase in the amount of seeking performed at the time of a restore of the source storage 110, may be reduced by reordering the block references in a copy of the FSFAT of the FSM 126 that is included in a backup of the source storage 110 (FSFAT 134) to match the order of the corresponding blocks in the vault storage 108. In particular, as disclosed in FIG. 3B, the block references in the FSFAT 134 may be reordered such that the block references for the files SystemFile1.dll, ApplicationFile1.dll, and ApplicationFile2.dll match the order of the corresponding blocks in the vault storage 108. In particular, the block references for the files SystemFile1.dllemFile1.dll, ApplicationFile1.dll, and ApplicationFile2.dll are reordered during the virtual defragmentation of the FSFAT 134 such that the corresponding blocks from the vault storage 108 can be read in a generally linear fashion from the vault storage 108 and then stored in a generally linear fashion in the restore storage 112.

For example, as disclosed in FIG. 3B, the reordering of the block references in the FSFAT 134 during the virtual defragmentation results in the three duplicate copies of the block stored in the first location of the vault storage 108, namely location 108(1), being stored contiguously as a run in positions 112(2)-112(4) in the restore storage 112; a copy of the block stored in the second-fifth locations of the vault storage 108, namely locations 108(2)-108(5), being stored contiguously in positions 112(5)-112(8) in the restore storage 112; and a copy of the block stored in the sixth location of the vault storage 108, namely location 108(6), being stored in position 112(10) in the restore storage 112. Thus, the order of the reordered block references in the FSFAT 134 matches exactly the order of the corresponding blocks in the vault storage 108 which, during a subsequent restore of the source storage 110, allows these blocks to be read in a linear fashion from the vault storage 108 and then stored in a linear fashion in the restore storage 112, thus reducing seeking in the vault storage 108 and the restore storage 112.

Also, FIG. 3B discloses the FSM blocks stored in positions 108(7) and 108(8) being stored in positions corresponding to the original positions from the source storage 110, namely positions 112(1) and 112(9). The FSM blocks in the backup may thus be excluded from the virtual defragmentation phase due to, for example, file system preferences that prefer to have FSM blocks positioned in certain positions in a storage.

It is understood that although only four files are represented in the FSFATS and the storages in FIGS. 3A and 3B, each represented storage may, in fact, include one file, two files, three files, or more than four files. It is further understood although the four files represented in FIGS. 3A and 3B each includes only one, two, or three blocks, each file in a software application may include more than three blocks.

FIG. 4 is a schematic flowchart diagram of an example method 400 of virtual defragmentation during multiphase deduplication. The method 400 may be implemented, in at least some embodiments, by the virtual defragmentation module 120 of the source system 104 and the deduplication module 118 of the deduplication vault system 102 of FIG. 1. For example, the virtual defragmentation module 120 and the deduplication module 118 may be configured to execute computer instructions to perform operations of virtually defragmenting the source storage 110 prior to, during, or after the creation of a backup of the source storage 110, as represented by one or more of phases 402-408 which are made up of the steps 410-418 of the method 400. Although illustrated as discrete phases and steps, various phases/steps may be divided into additional phases/steps, combined into fewer phases/steps, or eliminated, depending on the desired implementation. The method 400 will now be discussed with reference to FIGS. 1-4.

The analysis phase 402 of the method 400 may include a step 410, in which each allocated block stored in a source storage is analyzed to determine if the block is duplicated in the vault storage. For example, the deduplication module 118 may analyze each allocated block stored in the source storage 110 at time t(0) to determine if the block is duplicated in the vault storage 108. By determining which blocks stored in the source storage 110 are duplicated in the vault storage 108, the order of the duplicated blocks as stored in the vault storage 108 can also be determined.

The virtual defragmentation phase 404 of the method 400 may include a step 412, in which the FSM blocks included in the backup of the source storage are accessed, and a step 414, in which block references in the FSM blocks are reordered to match the order of the corresponding blocks as stored in the vault storage. For example, the virtual defragmentation module 120 may access the FSFAT 134 disclosed in FIG. 3B that is included in FSM blocks of the backup of the source storage 110, such as in the FSM blocks stored in positions 108(7) and 108(8) as disclosed in FIG. 3A, and then reorder block references in the FSFAT 134 to match the order of the corresponding blocks as stored in the vault storage 108.

As noted previously, and as illustrated in FIGS. 2, 3A, and 3B, these reordered block references may include block references corresponding to blocks that make up the contents of one or more files of an operating system or a software application that is installed in the source storage. Further, the blocks that make up the contents of the one or more files of the operating system or the software application may be stored in the vault storage 108 in the sequence of a clean install of the operating system or the software application. Further, where it is known in advance that the particular source storage 110 will eventually be backed up to the vault storage 108, and the particular operating system and/or the particular software applications installed in the source storage 110 are known, the particular operating system and/or the particular software applications can be included in the blocks stored in, or seeded into, the vault storage 108.

Also, as noted previously, and as illustrated in FIGS. 3A and 3B, during the virtual defragmentation phase 404, block references for each set of local duplicate blocks, such as the set of local duplicate blocks that was stored in positions 110(5), 110(2), and 110(10) in the source storage 110 at the time t(0), may be reordered as a run in the reordered FSM blocks, such as the run indicated in locations 110(2)-110(4) in the FSFAT 134 in FIG. 3B.

Further, the reordering of block references in the FSM blocks to match the order of the corresponding blocks as stored in the vault storage 108 during the virtual defragmentation phase 404 may include only the reordering of block references corresponding to the data blocks in the backup and not the reordering of block references corresponding to the FSM blocks in the backup. For example, block references corresponding to the FSM blocks at positions 110(1) and 110(9) as disclosed in FIG. 3A may not be reordered during the virtual defragmentation phase in order to allow the blocks to ultimately be restored in similar positions 112(1) and 112(9) in the restore storage 112 due to, for example, file system preferences that prefer to have FSM blocks positioned in certain positions in a storage.

The backup phase 406 of the method 400 may include a step 416, in which each unique nonduplicate block from the source storage is stored in the vault storage. For example, the deduplication module 118 may store each block from the source storage 110, which was determined during the analysis phase 402 to be a unique nonduplicate block, in the vault storage 108. The blocks stored in the vault storage 108 during the backup phase 406 may include both FSM blocks as well as data blocks.

By the conclusion of the backup phase 406, a base backup of the source storage 110 will have been stored in the vault storage 108. Unlike a standard base backup image, however, the backup of the source storage 110, as stored in the vault storage 108, will likely have been reduced in size due to the elimination of local duplicate blocks within the base backup. In addition, where multiple storages are backed up into the vault storage 108, the total overall size of the backups will likely be reduced in size due to the elimination of global duplicate blocks across the backups.

It is noted that the analysis phase 402, the virtual defragmentation phase 404, and the backup phase 406 can also be employed to create an incremental backup of a storage, which will store and track only those allocated blocks in the source storage 110 that changed between the point in time of a previous backup and the point in time of the incremental backup. It is further noted that the virtual defragmentation phase 404 may be performed prior to, during, or after the backup phase 406, or may be performed in some combination prior to, during, or after the backup phase 406. For example, the virtual defragmentation phase 404 may begin prior to the backup phase but then conclude during the backup phase 406.

The restore phase 408 of the method 400 may include a step 418, in which each allocated block that was stored in the source storage is restored to a restore storage in the position indicated in the reordered FSM. For example, the deduplication module 118 may read, from the vault storage 108, and restore, in the restore storage 112, each allocated block that was stored in the source storage 110 at time t(0) in the same position as indicated in the reordered FSFAT 134 disclosed in FIG. 3B after the conclusion of the virtual defragmentation phase 404. At the conclusion of the restore phase 408, the backup of the source storage 110 will be restored to the restore storage 112, such that the restore storage 112 will include identical files as the source storage 110 at time t(0) but the positions of the blocks that make up the contents of those files may be reordered as indicated in the FSFAT 134 at the conclusion of the virtual defragmentation phase 404.

Also, as noted previously in connection with FIGS. 3A and 3B, since the virtual defragmentation phase 404 results in the order of the blocks in the source storage 110 being reordered to match the order of the blocks as stored in the vault storage 108, the amount of time necessary to subsequently restore the backup to the restore storage 112 may be decreased due to a decrease in the amount of seeking that must be performed at the vault storage 108 and the restore storage 112 during the restore phase.

Further, as noted previously, and as illustrated in FIGS. 3A and 3B, during the restore phase 408, each of the runs of local duplicate blocks in the reordered FSM blocks, such as the run indicated in locations 110(2)-110(4) in the FSFAT 134, may be stored in the restore storage 112 as indicated in the reordered FSM blocks, such as the run stored in locations 112(2)-112(4) in the restore storage 112.

The analysis phase 402 and the backup phase 406 may be accomplished, for example, by performing the steps of the analysis phase 802 and the backup phase 804 disclosed in related U.S. patent application Ser. No. 13/782,549 referenced above.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of multiphase deduplication, the method comprising:
 a backup phase that includes storing, in a deduplication vault storage, a backup of a source storage, the backup including each unique nonduplicate allocated block from the source storage at a point in time including file system metadata (FSM) blocks and data blocks;
a virtual defragmentation phase that includes accessing the FSM blocks included in the backup and reordering block references in the FSM blocks to match the order of the corresponding blocks as stored in the deduplication vault storage; and
a restore phase that is performed after the completion of the virtual defragmentation phase and that includes reading, from the deduplication vault storage, and storing, in a restore storage, each allocated block that was stored in the source storage at the point in time according to the reordered block references in the FSM blocks.

2. The method as recited in claim 1, wherein the virtual defragmentation phase is performed prior to the backup phase.

3. The method as recited in claim 1, wherein the virtual defragmentation phase is at least partially performed during the backup phase.

4. The method as recited in claim 1, wherein the virtual defragmentation phase is performed after the backup phase.

5. The method as recited in claim 1, wherein:
during the virtual defragmentation phase, block references for each set of local duplicate blocks that was stored in the source storage at the point in time is reordered as a run in the reordered block references in the FSM blocks; and
during the restore phase, each of the runs of local duplicate blocks is stored in the restore storage according to the reordered block references in the FSM blocks.

6. The method as recited in claim 1, wherein the reordering of block references in the FSM blocks to match the order of the corresponding blocks as stored in the deduplication vault storage includes only the reordering of block references corresponding to the data blocks in the backup and not the reordering of block references corresponding to the FSM blocks in the backup.

7. The method as recited in claim 1, wherein the FSM includes a file system file allocation table (FSFAT) and a file system block allocation map (FSBAM).

8. One or more non-transitory computer-readable media storing one or more programs that cause one or more processors to execute the method as recited in claim 1.

9. A method of multiphase deduplication, the method comprising:
an analysis phase that includes analyzing each allocated block, including file system metadata (FSM) blocks and data blocks, stored in a source storage at a point in time to determine if the block is duplicated in a vault storage;
a backup phase that is performed after completion of the analysis phase and that includes storing, in the vault storage, a backup including each unique nonduplicate allocated block from the source storage; and
a virtual defragmentation phase that includes accessing the FSM blocks that are included in the backup and reordering block references in the FSM blocks to match the order of the corresponding blocks as stored in the deduplication vault storage.

10. The method as recited in claim 9, wherein the virtual defragmentation phase is performed at a source system associated with the source storage.

11. The method as recited in claim 9, wherein:
the reordered block references include block references corresponding to the blocks that make up the contents of one or more files of an operating system that is installed in the source storage; and
the one or more files of the operating system are stored in the vault storage in the sequence of a clean install of the operating system.

12. The method as recited in claim 9, wherein:
the reordered block references include block references corresponding to the data blocks that make up the contents of one or more files of a software application that is installed in the source storage; and
the one or more files of the software application are stored in the vault storage in the sequence of a clean install of the software application.

13. The method as recited in claim 9, further comprising a restore phase that is performed after the completion of the virtual defragmentation phase and that includes reading, from the vault storage, and storing, in a restore storage, each allocated block that was stored in the source storage at the point in time according to the reordered block references in the FSM blocks.

14. The method as recited in claim 13, wherein:
during the virtual defragmentation phase, block references for each set of local duplicate blocks that was stored in the source storage at the point in time is reordered as a run in the reordered block references in the FSM blocks; and
during the restore phase, each of the runs of local duplicate blocks is stored in the restore storage according to the reordered block references in the FSM blocks.

15. The method as recited in claim 13, wherein the reordering of block references in the FSM blocks to match the order of the corresponding blocks as stored in the deduplication vault storage includes only the reordering of block references corresponding to the data blocks in the backup and not the reordering of block references corresponding to the FSM blocks in the backup.

16. One or more non-transitory computer-readable media storing one or more programs that cause one or more processors to execute the method as recited in claim 9.

17. The method as recited in claim 9, wherein the virtual defragmentation phase is at least partially performed during the backup phase.

18. A method of multiphase deduplication, the method comprising:
an analysis phase that includes analyzing each allocated block, including file system metadata (FSM) blocks and data blocks, stored in a source storage at a point in time to determine if the block is duplicated in a vault storage;
a backup phase that is performed after completion of the analysis phase and that includes storing, in the vault storage, a backup including each unique nonduplicate allocated block from the source storage;
a virtual defragmentation phase that includes accessing the FSM blocks that are included in the backup and reordering block references corresponding to data blocks in the FSM blocks to match the order of the corresponding blocks as stored in the deduplication vault storage, the block references for each set of local duplicate data blocks that are included in the backup being reordered as a run in the reordered FSM blocks; and
a restore phase that is performed after the completion of the virtual defragmentation phase and that includes reading, from the vault storage, and storing, in a restore storage, each allocated block that was stored in the source storage at the point in time according to the reordered block references in the FSM blocks, each of the runs of local duplicate data blocks being stored in the restore storage according to the reordered block references in the FSM blocks.

19. One or more non-transitory computer-readable media storing one or more programs that cause one or more processors to execute the method as recited in claim 18.

20. The method as recited in claim 18, wherein the virtual defragmentation phase is at least partially performed during the backup phase.

* * * * *